D. H. BUZZEE.
Rubber Fabrics.
No. 67,262. Patented July 30, 1867.
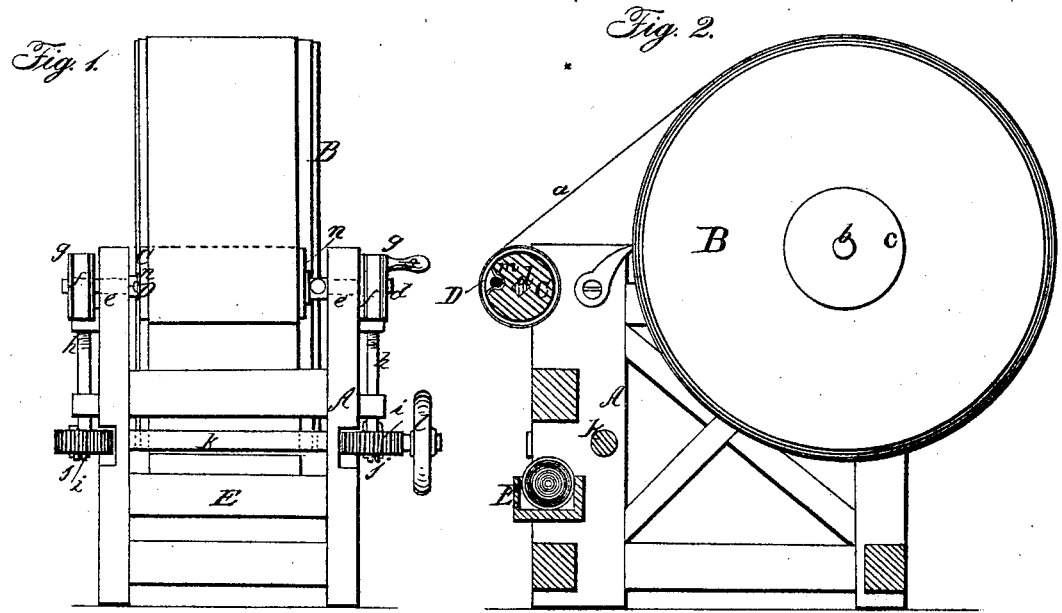
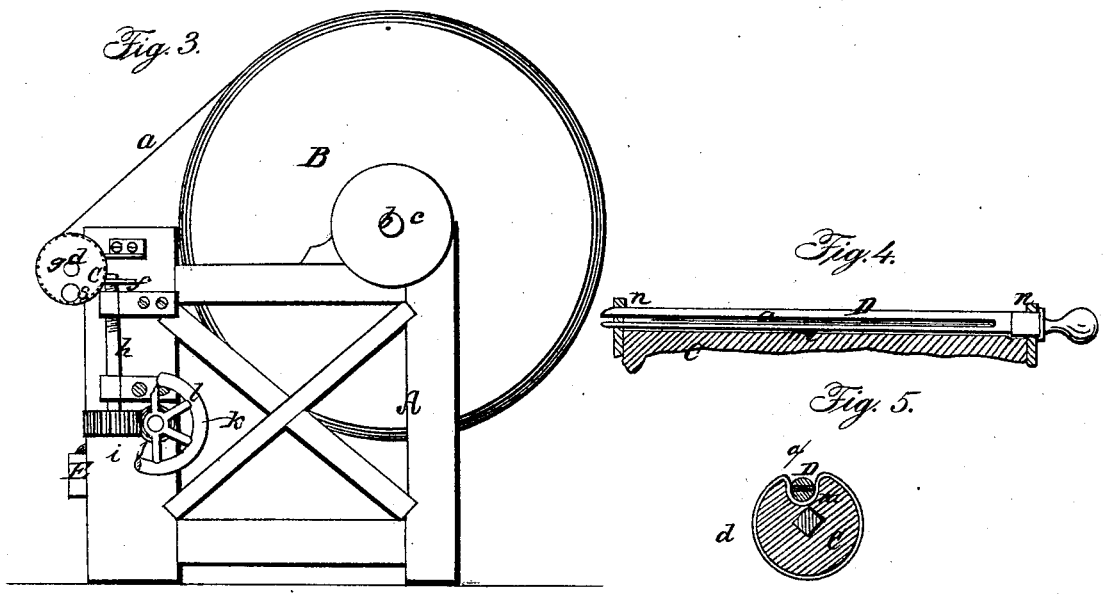
Witnesses:
Inventor:

United States Patent Office.

D. H. BUZZEE, OF EAST HAMPTON, MASSACHUSETTS.

*Letters Patent No. 67,262, dated July 30, 1867.*

IMPROVED MACHINE FOR LAYING RUBBER SHEETS TO BE CUT INTO THREADS.

*The Schedule referred to in these Letters Patent and making part of the same.*

TO ALL WHOM IT MAY CONCERN:

Be it known that I, D. H. BUZZEE, of East Hampton, in the county of Hampshire, and State of Massachusetts, have invented a certain new and useful Improvement on Machines for Laying Rubber Sheets, of which the following is a full, clear, and exact description, reference being had to the accompanying drawing, forming part of this specification, and in which—

Figure 1 represents a front elevation of a machine constructed according to my improvement.

Figure 2, a longitudinal section of said machine in part, taken at right angles to fig. 1.

Figure 3, a side view thereof in part, and

Figures 4 and 5 longitudinal and transverse views or sections of the clamp, in its connection with the feeding-cylinder or roller for holding the sheet in its transmission to the take-up or laying-cylinder.

Like letters indicate like parts throughout the several figures.

My improvement relates to laying or winding sheet rubber on cylinders for after-division into longitudinal strips or threads to form webbing, or for other purposes. This has heretofore been done by laying the sheet rubber on the cylinder in as smooth and regular a manner as regards stretch as ordinarily practicable, and afterwards placing the cylinder with the wrapped rubber upon it in a lathe for division of it by a cutter or cutters into threads or strips of suitable width. Owing to the elastic and peculiar character of the material thus to be worked, and the varying thicknesses of the sheets, much difficulty has been experienced in laying the sheet rubber on the cylinder in an equable and regular manner to secure its being afterwards cut into strips or threads of a uniform thickness and width. To obviate this difficulty is the object of the first part of my invention, the nature of which consists in a combination with the feeding and wrapping-cylinders of a double adjustable brake, one to either end of the feeding-cylinder or roller, simultaneously controllable by a single or common action, so as to form uniform tension on the feeding-roll at opposite ends, and adjustable according to the thickness and other peculiarities or run of the sheet; and the nature of my invention further consists in a novel construction and application of clamp to the feeding-roll to receive and hold or detach with security and rapidity the one end of the sheet. Referring to the accompanying drawing—

A represents the frame of the machine, which may be built in any suitable manner. B is the cylinder on which the sheet rubber $a$ is wound for after-division into strips or threads. This shaft $b$ of this cylinder carrying a driving-pulley, $c$, may rest loosely in its bearings to facilitate transfer of the cylinder with the rubber on it to the splitting or cutting lathe. Parallel with this cylinder B, and in front of it, is a feeding-cylinder, C, so called as the sheet rubber is wrapped on it to feed or supply the laying-cylinder, and from which the sheet is unwrapped by the rotary motion of the cylinder B. This front cylinder or roller C is hung by its shaft $d$ in bearings $e$, and has its freedom of run controlled by friction bands $f$, acting on brake-wheels $g$ at opposite ends of said cylinder or its shaft $d$. These bands $f$ are made simultaneously to bear on the brake-wheels $g$, and adjusted to produce any required amount of friction thereon, or released from frictional pressure, by means of vertical screws $h$, acting on the loose ends of the bands, and operated by worm-wheels $i$ through screws $j$ fast to a shaft, $k$, set in motion by a hand-crank or wheel, $l$. By thus arranging brakes at opposite ends of the cylinder C, simultaneously controllable, the tension on the rubber sheet is more equally regulated throughout its width, and it will be evident that the nicest adjustment may be given by the means described to the tension on the sheet to keep it taut, and even in winding on the cylinder B without unnecessary, unequal, or objectionable stretch, so that in afterward cutting it into threads, the same will be uniform in width and thickness. This adjustment is not necessarily a fixed one according to the thickness of the sheet, but requires to be modified to meet a variety of circumstances, including the run of the laying-cylinder, and the amount of rubber on the feeding-cylinder, and quantity in wrap on the laying-cylinder, which relative amounts are constantly changing, and varying the stretch, that may be regulated by the means I have described with the greatest accuracy.

The one end of the sheet $a$ is or may be fastened on the laying-cylinder B in the usual or any suitable way, while the other end I secure to the feeding-roller C by introducing it between a spring or divided clamp consisting of a split rod, D, lying in a longitudinal recess, $m$, in said roller, and fitting through sockets or eyes $n$ that serve to hold it in place and keep it from turning; also lock or close the clamp with the rubber in between it, by said rod being formed with a square shoulder in its passage through one of the eyes, and of tapering or close-fitting character in its passage through the opposite eye, or otherwise equivalently holding and closing the clamp, and so that it may be drawn out from the end to admit of its opening for reception or withdrawal of the sheet, and when inserted in the roller to extend across and within it to grasp the sheet throughout its width without interfering with the even wrap of it on the roller. The sheet may be fed to the roller C by depositing it in the form of a roll in a lower box E, and its outer end carried upward, so as to be grasped by the clamp or rod D, as described, when the brakes are released, and one of the brake-wheels $g$ turned by a handle, $s$, to wind the sheet on the feed-roller C, after which, on the one end of the sheet being secured to the laying-cylinder, the friction bands $f$ are brought to bear on the wheels with the necessary force, and adjusted from time to time, as required during the action of the laying-cylinder in taking up the sheet as already specified.

What I claim as my invention, and desire to secure by Letters Patent, is—

1. The combination in a machine for laying rubber sheets, of the cylinders B and C, and tension device or brake arranged to act simultaneously upon both ends of the feeding-cylinder, the whole being constructed for operation together substantially as specified.

2. The combination, with the feeding-cylinder C, of the split clamping-rod D, arranged to occupy a recess in said cylinder in direction of its length, and gearing with the same, essentially as herein set forth.

D. H. BUZZEE.

Witnesses:
W. J. WOOSTER,
J. W. WILSON.